United States Patent [19]
Akashi et al.

[11] Patent Number: 5,989,617
[45] Date of Patent: Nov. 23, 1999

[54] METHOD OF ASSESSING WHEAT OR WHEAT FLOUR REGARDING SUITABILITY FOR PRODUCING NOODLES

[75] Inventors: Hajime Akashi; Miwa Takahashi, both of Ohi-machi; Yasuhiro Tanaka, Tokyo; Masakazu Mizukami, Tokyo; Masahiko Kamada, Tokyo, all of Japan

[73] Assignee: Nisshin Flour Milling Co., Ltd., Tokyo, Japan

[21] Appl. No.: 09/110,178

[22] Filed: Jul. 6, 1998

[30] Foreign Application Priority Data

Jul. 7, 1997 [JP] Japan ................................. 9-195258
Feb. 27, 1998 [JP] Japan ................................. 10-064514

[51] Int. Cl.⁶ ............................. A21D 10/00; A21D 13/00

[52] U.S. Cl. ....................... 426/549; 426/451; 426/661; 127/29; 127/32

[58] Field of Search ................................. 426/231, 549, 426/661, 451; 127/29, 32; 73/169

[56] References Cited

U.S. PATENT DOCUMENTS

| | | | |
|---|---|---|---|
| 4,830,866 | 5/1989 | Manser et al. | 426/451 |
| 5,364,471 | 11/1994 | Czuchajowska et al. | 127/65 |
| 5,849,090 | 12/1998 | Haralampu et al. | 127/65 |
| 5,902,410 | 5/1999 | Chiu et al. | 127/71 |

*Primary Examiner*—Nina Bhat
*Attorney, Agent, or Firm*—Sughrue, Mion, Zinn, Macpeak & Seas, PLLC

[57] ABSTRACT

The present invention is directed to a method of assessing suitability of wheat or wheat flour for producing noodles, wherein starch contained in the wheat or wheat flour is analyzed by differential scanning calorimetry for its thermal characteristics and assessment is carried out based on the results of the analysis; wheat flour which is suitable for preparing noodles, wherein the wheat flour is prepared from wheat containing starch having an endothermic enthalpy ($\Delta H$) of 0.3 J/g of dry matter or less at a thermal change onset temperature (To) of 80° C. or higher when the starch is analyzed by differential scanning calorimetry in the presence of added water; and use of the wheat or wheat flour for preparing noodles.

18 Claims, 1 Drawing Sheet

FIG. 1  Differential scanning calorimetry thermogram of wheat starch
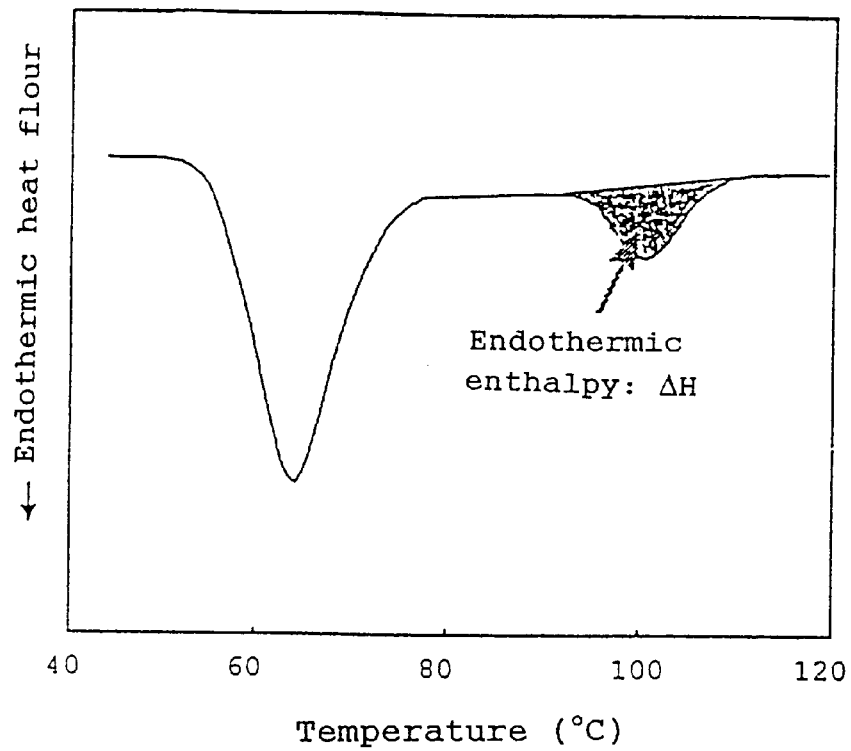
FIG. 2
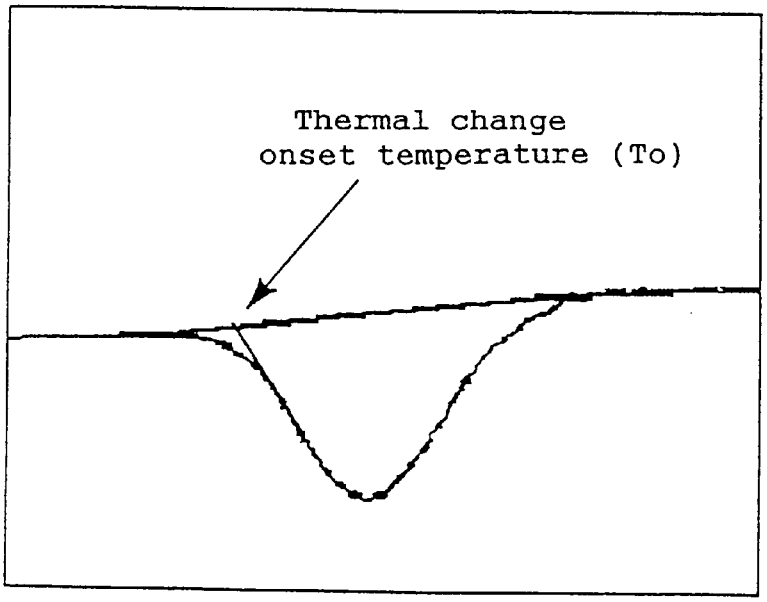

METHOD OF ASSESSING WHEAT OR WHEAT FLOUR REGARDING SUITABILITY FOR PRODUCING NOODLES

BACKGROUND OF THE INVENTION

1. Field of the Invention

The present invention relates to a method of assessing the suitability of wheat or wheat flour for production of noodles; a method of manufacturing wheat flour for producing noodles by use of wheat evaluated to possess excellent suitability for producing noodles according to the assessing method; the wheat flour evaluated to possess excellent suitability for producing noodles; noodles prepared from the wheat flour; a farina composition comprising the wheat flour; and noodles prepared from the farina composition.

2. Description of the Related Art

Suitability of starting material wheat (hereinafter referred to simply as "wheat") for producing noodles has conventionally been well known to depend on the meteorological conditions under which wheat is cultivated, as well as the district where the wheat is grown, its variety, and the blend condition of wheat grains.

Suitability of wheat flour for producing noodles is also known to vary according to the variety (or market class) of wheat milled into wheat flour as well as the period and conditions of storage for the wheat flour.

Conventionally known methods of assessing suitability of wheat or wheat flour for producing noodles include 1) methods in which noodles are actually produced from wheat flour obtained by milling wheat in situ or by use of wheat flour already milled so as to evaluate handling characteristics when made into noodles, and in which sensory tests or the like are employed to evaluate the quality of the thus-obtained noodles, and 2) methods in which physical properties are evaluated by the amylograph test or a similar test method.

However, the conventional methods described above in 1) have a drawback that they require experience and much time and effort on the part of the experimenters, because noodles must actually be produced for evaluation of suitability of wheat or wheat flour for producing noodles. The conventional methods described above in 2) are also disadvantageous in that a large amount of sample is required and that suitability of wheat or wheat flour for producing noodles cannot be evaluated directly. Thus, there has been demanded a simple, quick, and accurate method of assessing suitability of wheat or wheat flour for producing noodles, as well as wheat flour evaluated to possess excellent suitability for producing noodles according to the assessing method.

Noodles are stored, distributed, and sold in various forms such as uncooked (moisture-containing conditions), semi-dry, dry, boiled, steamed, frozen, and instant noodles. Of the uncooked wet noodles (hereinafter simply referred to as uncooked noodles), those for microwave cooking have recently become of interest as consumers are becoming oriented toward convenience in eating. Unlike conventional uncooked, semi-dry, and dry noodles, uncooked noodles for microwave cooking do not require such procedures as boiling a large amount of water and boiling the noodles in the water for a long time, and are easily prepared only by cooking in a microwave cooking device such as a microwave oven after the noodles are put into a container along with a small amount of water or hot water. In addition, they exhibit better texture than do conventional instant noodles. Therefore, demand for them is expected to grow. However, uncooked noodles for microwave cooking developed hitherto generally require 3–5 minutes of cooking, thus falling short of the expectations of consumers, who prefer a shorter cooking time. Thus, there has been a demand for the development of uncooked noodles for microwave cooking which require a shorter cooking time than do their conventional equivalent and which exhibit excellent eating qualities.

SUMMARY OF THE INVENTION

An object of the present invention is to provide a simple, quick, and accurate method of assessing suitability of wheat or wheat flour for producing noodles which requires neither actual making of noodles for the evaluation of suitability for producing noodles nor chemical analysis of wheat or wheat flour.

Another object of the present invention is to provide a method of manufacturing wheat flour for noodles possessing excellent suitability for producing noodles based on the results of evaluation obtained by the aforementioned assessing method.

Still another object of the present invention is to provide wheat flour which is remarkably suitable for producing noodles.

A further object of the present invention is to provide noodles obtained by use of the aforementioned wheat flour for noodles which are endowed with excellent eating qualities.

A still further object of the present invention is to provide uncooked noodles for microwave cooking which are easily prepared in a shorter time than is their conventional equivalent by use of a microwave cooking device such as a microwave oven and which exhibit excellent eating qualities; a method of manufacturing the same; and wheat flour and a farina composition suitable for producing the same.

In order to attain the objects described above, the inventors of the present invention have carried out careful studies and have found a close correlation between the results obtained by subjecting starch contained in wheat or wheat flour to differential scanning calorimetry so as to analyze its thermal characteristics, and the suitability of wheat or wheat flour for producing noodles, leading to the finding that suitability of wheat or wheat flour for producing noodles can be accurately evaluated by merely performing differential scanning calorimetry on starch contained in wheat or wheat flour.

The inventors have also found that when the differential scanning calorimetry described above is performed on starch contained in wheat or wheat flour (hereinafter referred to simply as "wheat starch") to which water is added, the thermal characteristics of the starch can be analyzed in a simple and accurate manner.

The present inventors have also found that high-quality noodles exhibiting excellent eating qualities can be manufactured in a smooth manner when either of the following types of wheat flour is used: 1) wheat flour obtained by milling wheat containing starch that satisfies predetermined conditions based on the results obtained by subjecting wheat starch to differential scanning calorimetry, and 2) wheat flour containing starch that satisfies the predetermined conditions described as in 1).

In addition, wheat flour evaluated to possess excellent suitability for producing noodles by the assessing method of the present invention has been found to be suitable not only for producing various forms of noodles such as uncooked, semi-dry, dry, boiled, steamed, frozen boiled, and instant noodles but also for producing various types of noodles including Udon (standard Japanese-type white salted noodles), Kishimen (flat Japanese-type white salted noodles), Somen (very thin Japanese-type white salted dry noodles), Hiyamugi (thin Japanese-type white salted dry noodles), Ramen (Chinese-type yellow alkaline noodles), pastas, and soba (buckwheat noodles made from a mixture of buckwheat flour and wheat flour), as well as for producing dough sheets such as pasta wrapping for gyoza (Chinese-style meat dumplings) and for won ton.

The present inventors have also found that there can be obtained uncooked noodles for microwave cooking that can be cooked in a shorter time than can their conventional equivalent and that exhibit excellent eating qualities when manufactured by use of wheat flour evaluated to possess excellent suitability for producing noodles by the assessing method of the present invention.

The inventors of the present inventions have also found that, when noodles are manufacturing by use of starch and wheat flour evaluated to possess excellent suitability for producing noodles by the aforementioned assessing method, the cooking time is further shortened and deterioration in soft and less elastic texture after cooking is suppressed to a greater extent, thereby obtaining noodles exhibiting excellent eating qualities. The present inventors have also found that use of both wheat flour and starch as described above is particularly effective for manufacturing uncooked noodles for microwave cooking. Based on these findings, the inventors have accomplished the present invention.

Accordingly, the present invention is directed to a method of assessing suitability of wheat or wheat flour for producing noodles characterized in that starch contained in wheat or wheat flour is analyzed by differential scanning calorimetry in order to analyze its thermal characteristics, and based on thus-obtained results, suitability of wheat or wheat flour for producing noodles is assessed.

The present invention includes, as a preferred mode of carrying out the invention, the case in which the present method of assessing suitability of wheat or wheat flour for producing noodles is performed on starch to which water is added.

In addition, the present invention relates to a method of manufacturing wheat flour suitable for producing noodles by use of wheat containing starch having an endothermic enthalpy ($\Delta H$) of 0.3 J/g of dry matter or less at a thermal change onset temperature (To) of 80° C. or higher when the starch is analyzed by differential scanning calorimetry in the presence of added water. The present invention also relates to wheat flour suitable for noodles prepared thereby.

The present invention also relates to wheat flour for preparing noodles, the wheat flour containing starch having an endothermic enthalpy ($\Delta H$) of 0.3 J/g of dry matter or less at a thermal change onset temperature (To) of 80° C. or higher when the starch is analyzed by differential scanning calorimetry in the presence of added water. The endothermic enthalpy ($\Delta H$) of starch contained in the wheat flour of the present invention described above is measured by differential scanning calorimetry, preferably in the presence of water added in an amount of at least 5 times that of starch on a dry weight basis.

In addition, the present invention relates to a farina composition for noodles characterized by containing the aforementioned wheat flour suitable for producing noodles and starch.

The present invention also relates to a method of manufacturing noodles by use of both wheat flour and starch possessing excellent suitability for producing noodles as described above.

In the above-mentioned farina composition for noodles and the method for manufacturing noodles of the present invention, the amount of starch is preferably 3–40 wt. % based on the total amount of the farina to be used for producing noodles.

Preferably, potato starch, tapioca starch, and corn starch are used singly or in combination of two or more to serve as the starch described above.

The wheat flour for noodles, farina composition for noodles, and method of manufacturing noodles of the present invention are suitable for producing various forms of noodles such as ordinary uncooked noodles, uncooked noodles for microwave cooking, semi-dried, dried, boiled, steamed, frozen boiled, and instant noodles, as well as various types of noodles including Udon (standard Japanese-type white salted noodles), Kishimen (flat Japanese-type white salted noodles), Somen (very thin Japanese-type white salted dry noodles), Hiyamugi (thin Japanese-type white salted dry noodles), Ramen (Chinese-type yellow alkaline noodles), pastas, and soba (buckwheat noodles made from a mixture of buckwheat flour and wheat flour). Accordingly, these noodles obtained by use of the wheat flour for noodles, farina composition for noodles, or method of manufacturing noodles of the present invention are encompassed in the scope of the present invention.

BRIEF DESCRIPTION OF THE DRAWINGS

FIG. 1 shows a typical thermogram for differential scanning calorimetry on wheat starch in the presence of added water.

FIG. 2 is an illustration for explaining a method of determining the analytic thermal change onset temperature (To) in the thermogram shown in FIG. 1.

DESCRIPTION OF THE PREFERRED EMBODIMENT

The present invention is described in detail hereinafter.

Differential scanning calorimetry referred to in the present invention encompasses both differential scanning calorimetry (DSC) of an input compensation type and differential thermal analysis (DTA) of a heat flux type.

In the present invention, differential scanning calorimetry is performed on wheat starch according to a conventionally known method; for example, by employing a method described in *Journal of Applied Glycoscience* Vol.41, No.3, 297–303 (1994).

No limitation is imposed on the apparatus used for differential scanning calorimetry so long as it can be used to perform DSC or DTA.

By employment of differential scanning calorimetry, there can normally be measured the thermal change onset temperature (To), the thermal change peak temperature (Tp), and the thermal change conclusion temperature (Tc), as well as the endothermic enthalpy ($\Delta H$) of a sample. In the present invention, at least two of these four physical properties of wheat starch are measured so as to investigate the relationship between the obtained results and suitability of wheat or wheat flour for producing noodles, to thereby select wheat or wheat flour suitable for producing noodles.

Particularly, the present invention requires measurement of only two of the four physical properties—the thermal change onset temperature (To) and the endothermic enthalpy ($\Delta H$)—of wheat starch for evaluation of suitability of wheat or wheat flour for producing noodles as described later, and wheat or wheat flour containing starch having an endothermic enthalpy (ΔH) of 0.3 J/g of dry matter or less at a thermal change onset temperature (To) of 80° C. or higher when the starch is analyzed by differential scanning calorimetry in the presence of added water is evaluated to be suitable for producing noodles.

According to the present invention, wheat starch contained in wheat is preferably prepared in the following manner for subjecting it to differential scanning calorimetry: Wheat is milled into whole wheat flour, and wheat starch contained in the whole wheat flour is separated from other constituents and recovered to thereby be subjected to differential scanning calorimetry.

According to the present invention, wheat starch recovered by separating the wheat starch from other constituents contained in wheat flour is preferably used for differential scanning calorimetry.

The wheat starch obtained from whole wheat flour or wheat flour and used for differential scanning calorimetry preferably contains crude protein in an amount of 0.5 wt. % or less and is not defatted. When defatted wheat starch is used, in many cases the endothermic peak may not appear, or may difficult to detect, at 80° C. or higher.

No limitation is imposed on the method of recovering wheat starch from whole wheat flour or wheat flour, so long as there can be obtained wheat starch containing crude protein in an amount of 0.5 wt. % or less as described above by the method. Examples of such methods include the dough washing method and the protease digestion method. Obtained wheat starch does not have to be defatted before being subjected to differential scanning calorimetry.

When the dough washing method is employed, the following is a preferred example of a method of preparing wheat starch: Dough balls are prepared from an appropriate amount of whole wheat flour or wheat flour and water (70 parts by weight of water with respect to 100 parts by weight of whole wheat flour or wheat flour). After resting the dough balls with soaking in cold water for 30 minutes, starch is washed therefrom by rinsing with water. To remove them particles of bran and gluten, the starch suspension is passed through a 100-mesh nylon sieve. The filtered starch slurry is centrifuged (3000 G, 10 min). After discarding the supernatants, the upper pigmented sediment layer is carefully removed by scrapping with spatula. Resultant white sediment layer is recovered and dried. The drying treatment does not require heat of 40° C. or higher, and such treatments as freeze drying, air-drying and drying under reduced pressure at ambient temperature are therefore included.

Differential scanning calorimetry is preferably performed on wheat starch obtained from wheat or wheat flour in the presence of added water, since more accurate results can be obtained thereby. More specifically,when differential scanning calorimetry is performed there are preferably added at least 500 parts by weight of water with respect to 100 parts by weight of dried wheat starch, and more preferably at least 700 parts by weight of water. If water is added in an amount of less than 500 parts by weight, the thermal change peak may not appear very clearly, leading to higher risk of experimental error. When differential scanning calorimetry is performed distilled water or pure water is preferably added to wheat starch, since more accurate results can be obtained thereby.

Thus, according to the present invention, suitability of wheat or wheat for producing noodles can be evaluated accurately and quickly by mere measurement of the thermal change onset temperature (To) and the endothermic enthalpy (ΔH) of wheat starch separated from wheat or wheat flour. Since the endothermic enthalpy (ΔH) values may vary according to the sample, apparatus, and measuring conditions, the endothermic enthalpy (ΔH) is preferably measured at least 3 times, more preferably at least 5 times, to obtain the average value to serve as the endothermic enthalpy (ΔH) of the wheat starch, based on which suitability of wheat or wheat flour for producing noodles is evaluated.

Noodles exhibiting excellent eating qualities such as excellent viscoelasticity and smoothness as well as softness, thickness, and excellent and favorable elasticity can be obtained when produced by use of wheat flour obtained by milling the wheat containing starch having an endothermic enthalpy (ΔH) of 0.3 J/g of dry matter or less at a thermal change onset temperature (To) of 80° C. or higher when the starch is analyzed by differential scanning calorimetry in t he presence of added water, or by use of wheat flour containing the same starch characteristics as above.

In this manner, there can also be easily produced uncooked noodles for microwave cooking that require a shorter cooking time than do their conventional equivalent and that exhibit the same excellent eating qualities as described above.

Thus, according to the present invention, in order to evaluate whether specific wheat or wheat flour possesses suitability for producing noodles, wheat starch contained in the wheat or wheat flour is subjected to differential scanning calorimetry in the presence of added water, and the endothermic enthalpy (ΔH) of the starch is measured at a thermal change onset temperature (To) of 80° C. or higher. Wheat or wheat flour having an endothermic enthalpy (ΔH) of 0.3 J/g of dry matter or less is evaluated to be suitable for producing noodles. Contrarily, wheat or wheat flour having an endothermic energy (ΔH) of higher than 0.3 J/g of dry matter at a thermal change starting temperature (To) of 80° C. or higher is evaluated to be unsuitable for producing noodles.

By use of wheat flour obtained by milling wheat that has been evaluated to be suitable for producing noodles or by use of wheat flour that has been evaluated to be suitable for producing noodles, there can be easily and quickly produced the intended noodles exhibiting excellent eating qualities without need to make noodles for tasting in advance for evaluation of suitability for producing noodles or need to perform chemical analysis on wheat or wheat flour.

The expression "endothermic enthalpy (ΔH) at a thermal change onset temperature (To) of 80° C. or higher when wheat starch is analyzed by differential scanning calorimetry" as used herein is intended to refer to the following.

When wheat starch contained in wheat or wheat flour is subjected to differential scanning calorimetry in the presence of added water, generally two endothermic peaks appear as shown in FIG. 1: one in a low temperature range where the thermal change onset temperature (To) is under 80° C., and the other in a high temperature range where it is 80° C. or higher. Of these two thermal change peaks, the endothermic enthalpy (ΔH) used in the present specification refers to the one found in the range of the thermal change onset temperature (To) of 80° C. or higher, and is obtained from the area of a thermal change peak. As shown in FIG. 2, the thermal change onset temperature (To) is the temperature at the intersection of the line obtained by connecting the baseline at the initiation of the endothermic peak and that at its conclusion and the tangent at the point which provides the maximum slope when the quantity of heat is decreasing.

The wheat that has been assessed in accordance with the present invention for suitability for preparing noodles and that has been assessed suitable for preparing noodles is milled by the known method and is used as wheat flour for noodles. No limitation is imposed on the method for preparing noodles by use of wheat flour obtained by the aforementioned milling method or on alternatively procuring wheat flour that has already been milled. That is, noodles can be made in a conventional manner suitably selected in accordance with the type of noodle.

More specifically, in accordance with the type of noodle and the noodle-making method, noodles can be prepared exclusively from the following type(s) of wheat flour: wheat flour obtained by milling wheat which contains starch having an endothermic enthalpy ($\Delta H$) of 0.3 J/g of dry matter or less at a thermal change onset temperature (To) of 80° C. or higher when the starch contained in the wheat undergoes thermal change (this type of wheat flour may be hereinafter referred to as "wheat flour a1") and/or wheat flour which has already been milled and which contains starch having an endothermic enthalpy ($\Delta H$) of 0.3 J/g of dry matter or less at a thermal change onset temperature (To) of 80° C. or higher when the starch contained in the wheat undergoes thermal change (this type of wheat flour may be hereinafter referred to as "wheat flour a2").

According to the present invention, another type of farina may also be used together with wheat flour a1 and/or wheat flour a2.

When another type of farina is used in combination with wheat flour a1 and/or wheat flour a2, it may be chosen among those conventionally employed for the manufacture of noodles. For example, there may be used starches such as potato starch, tapioca starch, corn starch, rice starch, wheat starch, barley starch, sweet potato starch, or cassava starch; chemically-processed products of these starches; wheat flour other than wheat flour a1 and a2; durum wheat flour; buckwheat flour; rice flour; barley flour; rye flour; corn flour; potato powder; sweet potato powder; and taro potato powder. These may be used singly or in combination.

In the case in which the above-described farina are used in combination with wheat flour a1 and/or a2, starches are preferably used. Particularly, one or more types of potato starch, tapioca starch, and corn starch are used.

In such a case of combined use, the amount of farina other than wheat flour a1 and/or a2 is preferably limited to 40% by weight or less, more preferably 25% by weight or less, with respect to the total weight of farina used for preparing noodles.

Particularly when starch (inter alia potato starch, tapioca starch, corn starch, or one or more chemically-processed products thereof) is used in combination with wheat flour a1 and/or a2 for preparing uncooked noodles for microwave cooking, in particular Chinese-type yellow alkaline noodles for microwave cooking, time required for microwave cooking can be greatly reduced, and in addition, cooked noodles provide greatly improved eating qualities, while retaining a high level of quality with minimal degradation in elasticity. In this case, the amount of starch to be used is preferably 3–40% by weight, more preferably 7–25% by weight, with respect to the total weight of the farina used for preparing uncooked noodles for microwave cooking.

In preparation of noodles from a combined use of wheat flour a1 and/or a2 plus another type of farina such as starch, the farina may be added to wheat flour a1 and/or a2 during preparation of noodles. Alternatively, the farina may be added to wheat flour a1 and/or a2 in advance to thereby prepare a farina blend for preparing noodles, and thereafter noodles may be prepared from the farina blend. The farina blend can be stored for long periods, and may be distributed and put on the market as a flour mixture for noodles. When this type of flour mixture is used, a step for blending "another" farina with wheat flour a1 and/or a2 is eliminated, and the target noodle products with high quality can be manufactured with ease and simplicity.

In the present invention, a variety of additives which have conventionally been used in the manufacture of noodles may further be incorporated as desired in accordance with the type of noodles, etc. Examples of optional additives include common salt, kansui (alkaline salt), egg white (powder), whole egg (powder), yolk (powder), wheat gluten, wheat gliadin, wheat glutenin, whey protein and other proteins, konjak powder, alginic acid, guar gum, carageenan, curdlan, cyriumseed gum and other gums, gelling agents, egg shell powder, oyster shell powder and other calcium sources, surfactants, yam powder, seaweed powder, amino acids, vitamins, and minerals. These may be used singly or in combination of two or more.

EXAMPLES

The present invention will next be described by way of example, which should not be construed as limiting the present invention thereto. Throughout the below-described examples, "%" refers to "% by weight" unless otherwise indicated.

In the Examples below, moisture content of freeze-dried wheat starch used for assessment by differential scanning calorimetry was determined as follows.

Moisture content of wheat starch

Moisture content (%) of wheat starch was calculated in accordance with equation (1), with the moisture content of wheat starch after the starch was dried at 135° C. for 2 hours being taken as 0%.

$$\text{Moisture content (\%) of wheat starch} = \{(W_1 - W_2)/W_1\} \times 100 \qquad (1)$$

wherein $W_1$=the weight (g) of wheat starch before the starch undergoes drying treatment at 135° C. for 2 hours; and $W_2$=the weight (g) of wheat starch after the starch undergoes drying treatment at 135° C. for 2 hours.

In the following examples, crude protein content of wheat starch used for assessment by differential scanning calorimetry was determined as follows.

Crude Protein Content of Wheat Starch

Wheat starch (dry starch; 1 g) was precisely measured in a glass test tube provided for exclusive use for the test. Concentrated sulfuric acid (15 ml) and one tablet (5 g) of catalyst (product of Nippon General K.K., "KJELTAB KBC") were added to the test tube. The test tube was placed in a digestion apparatus (Nippon General K.K., "2020 Digestor") preheated to 4200, and thermally digested for one hour at the same temperature. After completion of digestion, the test tube was removed from the apparatus, and allowed to cool to around room temperature. Subsequently, distilled water (75 ml) was added. The thus-obtained degraded matter was placed in an automated analyzer (Nippon General K.K., "KJELTAC AUTO 1030 Analyzer), and distillation with water vapor and titration were automatically carried out. The following equation (2) was used to determine the crude protein content of the wheat starch.

$$\text{Crude protein content (\%) of wheat starch} = (0.798 \times \{T_1 - T_2\} \times F/S)$$

wherein $T_1$=the titrimetric volume of digested wheat starch (ml); and $T_2$=the titrimetric volume of distilled water (ml);

F=a factor of 0.1 N sulfuric acid used as titrant; and S=the weight of wheat starch sample (dry matter) (g).

Example 1
Assessment of Wheat Regarding Suitability for Producing Noodles (Manufacture of Udon)
(1) Preparation of Wheat and Wheat Starch As Sample Groups 1 to 6, a total of six market classes of commercial wheat (four market classes of Japanese domestic soft wheat and two market classes of soft wheat produced in overseas countries) were provided. From each market class of commercial wheat, wheat starch was prepared according to the below-described procedure, and the resultant starch was subjected to differential scanning calorimetry.
Preparation of Wheat Starch (i) Wheat sample was milled into whole wheat flour using a coffee mill. Dough ball was prepared from whole wheat flour (30 g) and water (21 ml). After resting the dough ball with soaking in cold water (200 ml) for 30 min, starch was washed from it by rinsing with water.

(ii) The starch suspension obtained in the above procedure (i) was passed through a 100-mesh sieve to remove particles of bran and gluten. The filtrated starch slurry was centrifuged (3000 G, 10 min).

(iii) After discarding the supernatant, 50 ml of water was added to the precipitate, and the resultant suspension was centrifuged again under the same conditions as described above. After discarding the supernatant, the upper grayish brown sedimented layer was removed by scrapping with a spatula. Resultant white sedimented layer was recovered and freeze-dried. The freeze-dried starch block was ground in a mortar to have a particle size of 100-mess through. The thus obtained wheat starch was used as a test sample for differential scanning calorimetry.

(2) Differential Scanning Calorimetry (DSC) of Wheat Starch

Each Sample of the wheat starch obtained in procedure (1) was subjected to differential scanning calorimetry according to Processes (A) to (C) described below:
(A) Preparation of Samples (i) 5±0.2 mg of wheat starch (dry matter) was weighed in a sealable sample cell.

(ii) To the wheat starch weighed in procedure (i), deaerated distilled water (43±0.5 mg) was added. The mixture was gently stirred in order to let the water permeate the wheat starch.

(iii) A sealable sample cell with a lid thereon was placed on a die-receiving pan disposed in the center of the sample table of a sealer.

(iv) The pressure handle was rotated clockwise so that the pressure rod protruded from the front end of the die.

(v) The sample sealer bar was rotated counterclockwise so that the lid of the sample container was pressed to sink about 0.3 to 0.5 mm from the edge of the cell.

(vi) The bar was rotated clockwise about one turn, the pressure handle was rotated counterclockwise until it ran idle, and the pressure rod was raised.

(vii) The lever was rotated counterclockwise again to tight-seal the sample cell. Subsequently, the sample cell was removed from the die-receiving pan. (The thus-prepared sample was aged at room temperature for one hour, and was subsequently subjected to differential scanning calorimetry.)

(viii) In order to prepare a control sample, the same amount of deaerated distilled water was placed in a sample cell, and the container was completely sealed as above.
(B) Installation of Samples (i) From a differential scanning calorimeter (DSC 120 manufactured by Seiko Instruments Inc.), a fastener cover, an SUS lid, a heat sink outer lid, and a heat sink lid were removed, in this order.

(ii) A sample cell prepared in (A)(vii) above was placed on the front holder, and the control cell prepared in (A)(viii) above was placed on the rear holder.

(iii) The heat sink lid, heat sink outer lid, SUS lid, and fastener cover were orderly returned in place.
(C) Analysis (i) A TA station and a DSC module (manufactured by Seiko Instruments Inc.) were powered on, and the below-described temperature program, sample information, sampling time, and an end job were incorporated.

(ii) The temperature program was input (starting temperature; 25° C., retention time; 3 min, termination temperature 140° C., retention time; 5 min, temperature increase rate; 4° C./min).

(iii) The sample name, sample weight (dry base), control name, and control weight (mg) were input as the sample information.

(iv) The sampling time was preset to 0.5 sec.

(v) The end job was input.

(vi) The ZERO key and RUN key of the differential scanning calorimeter were subsequently pushed to start measurement.

(vii) Thermal change onset temperature (To) and endothermic enthalpy ($\Delta H$) were analyzed.

Table 3 below shows the data of endothermic enthalpy ($\Delta H$) as measured by the differential scanning calorimeter at a thermal change onset temperature (To) of not lower than 80° C., with regard to the wheat starch contained in the wheat of each sample group (six market classes of commercial wheat groups in total).

(3) Manufacture (Milling) of Wheat Flour From Each Wheat Class

The six market classes of commercila wheat were respectively milled in a Buhler test mill, to thereby obtain, according to the following milling method, six types of wheat flour of 60% extraction.
Method of Manufacturing (Milling) Wheat Flour (i) Conditioning of Wheat Wheat which served as starting material was weighed in a plastic bag. Water was added to the wheat so that moisture content became 14.0%. The mixture was shaken so that the water became uniformly dispersed. Then, the plastic bag was allowed to stand in a thermostatic chamber (at about 30° C.) for 23 hours with its opening fastened tight in order to prevent evaporation of water. Twenty-three hours thereafter, water was added to the wheat so that the water content became 14.5%. The mixture was shaken well until moisture was uniformly distributed. Then, the plastic bag was allowed to stand in a thermostatic chamber (at about 30° C.) for 30 minutes with its opening fastened tight.

(ii) Milling

The wheat which had undergone conditioning in procedure (i) above was added to the hopper of a milling machine (Buhler Laboratory Flour Mill, manufactured by Buhler) placed in a room where temperature was regulated at 25° C., and was milled at a feed rate of 66.7 g/min. In the milling machine, the roll clearances for different sets of rolls were adjusted as follows: brake roll left side; 0.1 mm, brake roll right side; 0.08 mm, middling roll left side; 0.06 mm, middling roll right side; 0.03 mm. The stock groups subjected to milling were six Stock Groups 1B to 3M shown in Table 1 below, a bran group, and a bran short group.

TABLE 1

| | (Combination of Sieves) | | | | | |
|---|---|---|---|---|---|---|
| | Groups (stock groups) | | | | | |
| | 1B | 2B | 3B | 1M | 2M | 3M |
| Sieve[1] | 30W | 36W | 40W | 40W | 50W | — |
| Sieve[1] | 8XX | 8XX | 9XX | 8XX | 8XX | 9XX |
| Sieve[1] | | | | 8XX | 8XX | 9XX |

Note
[1] For each sieve, the number on the left side represents the sieve size, "W" represents a wire sieve, and "XX" represents a nylon sieve.

(iii) Treatment of Milled Products (Preparation of Wheat Flour of 60% Extraction)

After completion of milling in procedure (ii) above, each of Stock Groups 1B, 2B, 3B, 1M, 2M, 3M, bran and bran short was weighed, and the total yield (total weight)(Wt)(g) thereof was obtained. Subsequently, Groups 1B and 1M were incorporated to make Group A; 2B and 2M to Group B; and 3B and 3M to Group C.

The value of 60% (0.6 Wt) of the total yield (Wt) (g) was calculated in advance. If Group A alone attained the value 0.6 Wt(g), wheat flour having a yield of 60% was prepared only from Group A. If the sole use of Group A did not attain the value 0.6 Wt(g), wheat flour having a yield of 60% was prepared from Group B for making up the shortage, in addition to Group A. If the total of Groups A and B did not attain 0.6 Wt(g), the shortage was made up by Group C, to thereby prepare wheat flour of 60% extraction.

(4) Manufacture of Udon (Japanese-type White Salted Noodle)

(i) Udon (Japanese-type white salted noodle) was prepared from the flour of 60% extraction. The ingredients (1 Kg flour, 30 g common salt, and 350 g water) were mixed in a horizontal type mixer for 12 minutes at 90 r.p.m. The common salt used was dissolved in water prior to use.

(ii) After mixing, crumbly dough mixture was transferred to noodle sheeting machine, sheeted between steel rollers 3.6 mm apart, folded once, sheeted, folded twice, sheeted, and then allowed to rest in a polyethylene bag for 30 minuets at room temperature. The single sheet of dough was then passed between the rollers three times, with the clearance successively reduced. The final thickness of the sheeted dough was adjusted to 2.5 mm at the final sheeting. The dough sheet was cut into noodle strands by passing through a pair of No.10 square grooved cutting rolls, to thereby obtain uncooked Udon.

(iii) Each sample of uncooked Udon (100 g) prepared in procedure (ii) above was immediately cooked in a large amount of boiling water (pH was adjusted to 5–6) while boiling time was adjusted so that the cooked noodle yield became 310±2%. Immediately after cooking, the Udon was washed with plenty of cold water, and then scooped up in a basket so as to drain water.

The cooked noodle yield of the noodle was calculated in accordance with Equation (3) below.

$$\text{Boiled noodle yield } (\%) = (A/B) \times 100 \quad (3)$$

wherein A represents the weight of boiled noodles (g) measured after boiling uncooked noodles (100 g) and draining water, and B represents the weight of farina (g) contained in uncooked noodle before boiling (provided that B was calculated on the assumption that the moisture content of the farina which had been used in manufacture of uncooked noodle was 14%).

(iv) Sensory evaluations of the cooked Udon were performed by a trained panel of ten members. Panelists compared the eating qualities of Udon in accordance with the evaluation criteria shown in Table 2.

(v) Independent of procedure (iii), each sample of uncooked Udon (200 g) obtained in procedure (ii) was immediately cooked in boiling water (pH was adjusted to 5–6) while cooking time was adjusted so that the cooked noodle yield became 280±2%. Immediately after cooking, the Udon was washed with plenty of cold water, and then scooped up in a basket so as to drain water. The cooked and cooled Udon was weighed about 200 g, placed on a tray, and rapidly frozen to −30° C. The thus-obtained frozen noodles were sealed in a plastic bag for preventing dryness, and stored at −20° C. for one week.

(iii) After one week had elapsed, the frozen noodles were taken out of the refrigerator and thawed in a large amount of boiling water for one minute. Immediately after thawing, the noodles were washed in cold water and drained of water. Sensory evaluations of the cooked Udon were performed by a trained panel of ten members. Panelists compared the eating qualities of Udon in accordance with the evaluation criteria shown in Table 2. The averaged evaluations are shown in Table 3 below.

TABLE 2

| (Evaluation criteria for Udon) | |
|---|---|
| 5 points | Highly viscoelastic, soft and thick, very smooth, and very good texture |
| 4 points | Slightly highly viscoelastic, Slightly highly soft and thick, smooth, and good texture |
| 3 points | Moderately viscoelastic, soft and thick, and smooth, with no particular features; and ordinary texture |
| 2 points | Slightly viscoelastic, slightly soft and thick, insufficiently smooth, slightly poor texture |
| 1 points | No viscoelasticity, very rough and hard, no smoothness, poor texture |

TABLE 3

| | Properties of wheat starch | | | Eating quality of Udon | |
|---|---|---|---|---|---|
| Sample group | Crude protain content (%/dry) | Endothermic enthalpy (ΔH) (J/dry g) | Thermal change onset temp. ($T_0$) (° C.) | Uncooked Udon After cooking | Frozen Udon after cooking |
| 1 | 0.31 | 0.33 | 93.5 | 1.5 | 1.2 |
| 2 | 0.30 | 0.44 | 93.0 | 3.1 | 2.9 |
| 3 | 0.25 | 0.50 | 93.1 | 2.8 | 2.5 |
| 4 | 0.32 | 0.18 | 94.0 | 4.8 | 4.2 |
| 5 | 0.28 | 0.24 | 93.8 | 4.4 | 4.1 |
| 6 | 0.25 | 0.18 | 94.1 | 4.6 | 4.2 |

Note
[1] Thermal change onset temperature ($T_0$) and endothermic enthalpy (ΔH) represent averages of five measurements.

(5) Assessment of Wheat Regarding Suitability for Producing Noodles

As seen from the results shown in Table 3, it is clear that there exists a strong relationship between the results of differential scanning calorimetry of the wheat starch contained in wheat and suitability of the wheat for producing noodles. Specifically, differential scanning calorimetry showed that the wheat starch contained in wheat that Sample Groups 4, 5, and 6, which exhibited an endothermic enthalpy (ΔH) of not greater than 0.3 J/dry g at a thermal change onset temperature ($T_0$) of 80° C. or higher, was very suitable for producing noodles, and the Udon manufactured from the wheat flour obtained through milling of the wheat of these examples exhibited high viscoelasticity, softness and thickness, smoothness, and very good texture, in both forms of noodle; i.e., boiled Udon which is obtained through boiling of uncooked noodles and frozen Udon which is obtained through freezing of boiled noodles.

Example 2
Assessment of Wheat Regarding Suitability for Producing Noodles (Manufacture of Ramen (Chinese-type Yellow Alkaline Noodle))

(1) As Sample Groups 7 to 10, four market classes of commercial hard wheat were provided. From each brand of wheat, wheat starch was prepared in the same manner in Example 1 (1).

(2) Wheat starch obtained in procedure (1) was subjected to differential scanning calorimetry in the same manner as in Example 1 (2). In Table 6 below are shown the data of endothermic enthalpy ($\Delta H$) as measured by the differential scanning calorimeter at a thermal change onset temperature ($T_0$) of not lower than 80° C.

Also, the crude protein content in each wheat starch obtained in procedure (1) was measured in the same manner as in Example 1. The results are shown in Table 6.

(3) The four market classes of commercial wheat prepared in procedure (1) were respectively milled in a Buhler test mill, to thereby obtain four types of wheat flour of 60% extraction.

Method of Manufacturing (Milling) Wheat Flour (i) Conditioning of wheat

Wheat which served as starting material was weighed in a plastic bag. Water was added to the wheat so that moisture content became 15.0%. The mixture was shaken so that the water became uniformly dispersed. Then, the plastic bag was allowed to stand in a thermostatic chamber (at about 30° C.) for 23 hours with its opening fastened tight in order to prevent evaporation of water. Twenty three hours thereafter, water was added to the wheat so that the water content became 15.5%. The mixture was shaken well until moisture was uniformly distributed. Then, the plastic bag was allowed to stand in a thermostatic chamber (at about 30° C.) for 30 minutes with its opening tight.

(ii) Milling

The wheat which had undergone conditioning in procedure (i) above was added to the hopper of a milling machine (Buhler Laboratory Flour Mill manufactured by Buhler) placed in a room where temperature was regulated at 25° C., and milled at a feed rate of 66.7 g/min. In the milling machine, the roll clearances for different sets of rolls were adjusted as follows: brake roll left side; 0.1 mm, brake roll right side; 0.08 mm, middling roll left side; 0.05 mm, middling roll right side; 0.02 mm. The stock groups subjected to milling were six Stock Groups 1B to 3M shown in Table 4 below, a bran group, and a bran short.

TABLE 4

(Combination of Sieves)

| | Groups (stock groups) | | | | | |
|---|---|---|---|---|---|---|
| | 1B | 2B | 3B | 1M | 2M | 3M |
| Sieve[1] | 30W | 36W | 40W | 40W | 50W | — |
| Sieve[1] | 9XX | 10XX | 10XX | 10XX | 10XX | 11XX |
| Sieve[1] | | | | 10XX | 10XX | 11XX |

Note
[1]Sieve: The left part number represents sieve size, "W" represents a wire sieve, and "XX" represents a nylon sieve.

(iii) Treatment of Milled Products (Preparation of Wheat Flour of 60% Extraction)

After completion of milling in procedure (ii) above, each of Stock Groups 1B, 2B, 3B, 1M, 2M, and 3M, the bran, and the bran short was weighed, and the total yield (total weight)(Wt)(g) therof was obtained. Subsequently, Groups 1B and 1M were incorporated to make Group A; 2B and 2M to Group B; and 3B and 3M to Group C. The value of 60% (0.6 Wt) of the total yield (Wt) (g) was calculated in advance. If Group A alone attained the value 0.6 Wt(g), wheat flour having a yield of 60% was prepared only from Group A. If the sole use of Group A did not attain the value 0.6 Wt(g), wheat flour having a yield of 60% was prepared from Group B for making up the shortage, in addition to Group A. If the total of Groups A and B did not attain 0.6 Wt(g), the shortage was made up by Group C, to thereby prepare wheat flour of 60% extraction.

(4) Manufacture of Ramen (Chinese-type Yellow Alkaline Noodle)

(i) Ramen (Chinese-type yellow alkaline noodle) was prepared from the flours of 60% extraction prepared as above (procedure 3 (iii)). The ingredients (1 Kg flour, 12 g kansui, and 330 g water) were mixed in a horizontal type mixer for 12 minutes at 90 r.p.m. Kansui used was the mixtures of 6 parts of potassium carbonate and 4 parts of sodium carbonate and dissolved in water before use.

(ii) After mixing, crumbly dough mixture was transferred to noodle sheeting machine, sheeted between steel rollers 3.2 mm apart, folded once, sheeted, folded twice, sheeted, and then allowed to rest in a polyethylene bag for 30 minutes at room temperature. The single sheet of dough was then passed between the rollers three times, with the clearance successively reduced. The final thickness of the sheeted dough was adjusted to 1.5 mm at the final sheeting. The dough sheet was cut into noodle strands by passing through a pair of No.20 square grooved cutting rolls. Before cooking, noodles were maturated in polyethylene bags for 24 hours at room temperature.

(iii) Each sample of maturated uncooked Ramen obtained in procedure (ii) above was cooked in a large amount of boiling water while cooking time was adjusted so that the cooked noodle yield became 240±2%. Immediately after boiling, the Ramen was placed in a bowl filled with hot soup. Sensory evaluations of the cooked Ramen were performed by a trained panel of ten members. Panelists compared the eating qualities of Ramen in accordance with the evaluation criteria shown in Table 5. The averaged evaluations are shown in Table 6 below. The boiled noodle yield was calculated in accordance with Equation (3) above.

(iv) Independent of procedure (iii), each sample of uncooked Ramen (200 g) obtained in procedure (ii) was immediately boiled in boiling water while boiling time was regulated so that the boiled noodle yield became 220±2%. Immediately after cooking, the Ramen was washed with plenty of cold water, and then scooped up in a basket so as to drain water. The cooked and cooled Ramen was weighed about 200 g, place on a tray, and rapidly frozen to −30° C. The thus-obtained frozen noodles were sealed in a plastic bag for preventing dryness, and stored at −20° C. for one week.

(iv) After one week had elapsed, the frozen noodles were taken out of the freezer, thawed in a large amount of boiling water for one minute. Immediately after thawing, the noodles were placed in a bowl filled with hot soup. Sensory evaluations of the cooked Ramen were performed by a trained panel of ten members. Panelists compared the eating qualities of Ramen in accordance with the evaluation criteria shown in Table 5. The averaged evaluations are shown in Table 6 below. The boiled noodle yield was calculated in accordance with Equation (3) above.

TABLE 5

(Evaluation criteria for Ramen)

| | |
|---|---|
| 5 points | Highly viscoelastic, highly elastic, smooth, springy and very good texture |
| 4 points | Slightly highly viscoelastic, slightly highly elastic, smooth, springy, and good texture |
| 3 points | Moderately viscoelastic, elastic, smooth and springy, with no particular features; and ordinary texture |
| 2 points | Slightly poor viscoelastic, insufficiently elastic, insufficiently smooth, and slightly poor texture |
| 1 points | No viscoelasticity, very rough and hard, no smoothness, and poor texture |

TABLE 6

| | Properties of wheat starch | | | Eating quality of Udon | |
|---|---|---|---|---|---|
| Sample group | Crude protein content (%/dry) | Endothermic enthalpy (ΔH) (J/dry g) | Thermal change onset temp. (T$_0$) (° C.) | Uncooked Udon After cooking | Frozen Udon after cooking |
| 7 | 0.31 | 0.61 | 92.8 | 2.8 | 2.4 |
| 8 | 0.32 | 0.64 | 93.0 | 3.4 | 3.0 |
| 9 | 0.28 | 0.66 | 92.9 | 3.5 | 3.1 |
| 10 | 0.29 | 0.26 | 93.1 | 4.5 | 4.3 |

Note
[1]Thermal change onset temperature (T$_0$) and endothermic enthalpy (ΔH) represent averages of five measurements.

(5) Assessment of Wheat Regarding Suitability for Producing Noodles

As seen from the results shown in Table 6, it is clear that there exists a strong relationship between the results of differential scanning calorimetry of the wheat starch contained in wheat and suitability of the wheat for producing noodles. Specifically, differential scanning calorimetry showed that the wheat starch contained in wheat that Sample Group 10 which exhibited an endothermic enthalpy (ΔH) of not greater than 0.3 J/dry g at a thermal change onset temperature (T$_0$) of 80° C. or higher, was very suitable for producing noodles, and the Ramen manufactured from the wheat flour obtained through milling of the wheat of this group exhibited high viscoelasticity, high elasticity, smoothness, springmess and very good texture, in both forms of noodle, i.e., boiled Ramen which is obtained through boiling of uncooked noodles and frozen Ramen which is obtained through freezing of boiled noodles.

Example 3
Assessment of Wheat Regarding Suitability for Producing Noodles (Manufacture of Uncooked Wet Ramen for Microwave Cooking)

(1) As Sample Groups 11 to 16, a total of six market classes of commercial wheat (four market classes of Japanese domestic soft wheat and two market classes of commercially available soft wheat produced in overseas countries) were provided. From each market class of wheat, wheat starch was prepared in the same manner as in Example 1 (1).

(2) Wheat starch obtained in procedure (1) was subjected to differential scanning calorimetry in the same manner as in Example 1 (2). In Table 8 below are shown the data of endothermic enthalpy (ΔH) as measured by the differential scanning calorimeter at a thermal change onset temperature (T$_0$) of not lower than 80° C.

Also, the crude protein content in each wheat starch obtained in procedure (1) was measured in the same manner as in Example 1. The results are shown in Table 8 below.

(3) The six market class groups of wheat prepared in procedure (1) were respectively milled in the same manner as in Example 1 (3), to thereby wheat flour of 60% extraction.

(4) Manufacture of Ramen

Ramen was prepared from the flours of 60% extraction prepared as above (Procedure (3)). The ingredients (1 Kg flour, 10 g kansui, and 350 g water) were mixed in a horizontal vacuum mixer under reduced pressure (−600 mmHg) for 10 min at 90 r.p.m. Kansui used was the mixtures of 6 parts of potassium carbonate and 4 parts of sodium carbonate and dissolved in water before use.

(ii) After mixing, crumbly dough mixture was transferred to noodle sheeting machine, sheeted between steel rollers 3.2 mm apart, folded once, sheeted, folded twice, sheeted, and then allowed to rest in a polyethylene bag for 30 minutes at room temperature. The single sheet of dough was then passed between the rollers three times, with the clearance successively reduced. The final thickness of the sheeted dough was adjusted to 1.4 mm at the final sheeting. The dough sheet was cut into noodle strands by passing through a pair of No.20 square grooved cutting rolls. Then, each sample of the Ramen (100 g) was put in a plastic bag with its opening sealed, and allowed to stand overnight at room temperature (about 20° C.).

(iii) The following day, to each sample of uncooked Ramen obtained in procedure (ii) placed in a heat-resistant container was poured hot water (about 95° C., 300 g), and the container was heated for 1 to 2 minutes in a microwave cooking instrument (Type ER-SC electronic oven (650 W) manufactured by Toshiba Corp.) with its opening open. Immediately after heating, concentrated soup was added to the Ramen in the container. Sensory evaluations of the cooked Ramen were performed by a trained panel of ten members. Panelists compared the eating qualities of Ramen in accordance with the evaluation criteria shown in Table 7. The averaged evaluations are shown in Table 8 below.

TABLE 7

(Evaluation criteria for uncooked wet Ramen for microwave cooking)

| | |
|---|---|
| 5 points | Sufficiently cooked, viscoelastic, elastic, smooth, springy and very good texture |
| 4 points | Adequately hard, substantially sufficiently cooked, slightly highly viscoelastic, slightly elastic, smooth, springy and good texture |
| 3 points | Slightly hard, moderately viscoelastic, soft, elastic, smooth and springy, in an edible condition |
| 2 points | Hard and rough slightly half-cooked, and poor texture |
| 1 points | Very hard and rough half-cooked, and very poor texture |

TABLE 8

Properties of wheat starch

| Sample group | Crude protein content (%/dry) | Endothermic enthalpy (ΔH) (J/dry g) | Thermal change onset temp. ($T_0$) (° C.) | Eating quality of Ramen Cooking Time (sec) | | | | |
|---|---|---|---|---|---|---|---|---|
| | | | | 60 | 75 | 90 | 105 | 120 |
| 11 | 0.31 | 0.33 | 93.5° C. | 1.8 | 2.3 | 2.6 | 2.9 | 3.4 |
| 12 | 0.30 | 0.44 | 93.0° C. | 1.9 | 2.5 | 2.9 | 3.3 | 3.7 |
| 13 | 0.25 | 0.50 | 93.1° C. | 2.0 | 2.4 | 2.8 | 3.3 | 3.6 |
| 14 | 0.32 | 0.18 | 94.0° C. | 3.3 | 3.6 | 4.0 | 4.5 | 5.0 |
| 15 | 0.28 | 0.24 | 93.8° C. | 3.0 | 3.4 | 3.9 | 4.5 | 4.9 |
| 16 | 0.25 | 0.18 | 94.1° C. | 3.2 | 3.5 | 4.0 | 4.5 | 5.0 |

[1] Thermal change onset temperature ($T_0$) and endothermic enthalpy (ΔH) represent averages of five measurements.
[2] Unit of endothermic enthalpy (ΔH): J/dry g
[3] Under "Eating quality of Ramen" was shown the quality of each Ramen for microwave cooking which was measured immediately after cooking in an electronic oven.

(5) Assessment of Wheat Regarding Suitability for Producing Noodles

As seen from the results shown in Table 8, it is clear that there exists a strong relationship between the results of differential scanning calorimetry of the wheat starch contained in wheat and suitability of the wheat for producing noodles. Specifically, differential scanning calorimetry showed that the wheat starch contained in wheat that Sample Groups 14 to 16 which exhibited an endothermic enthalpy (ΔH) of not greater than 0.3 J/dry g at a thermal change onset temperature ($T_0$) of 80° C. or higher, was very suitable for producing noodles, and the uncooked Ramen for microwave cooking manufactured from the wheat flour prepared through milling of the wheat of these examples attained an edible condition in such a short time as 60 to 120 seconds (1 to 2 minutes) of cooking (heating by an electronic oven). Especially in such a short time as 90 to 120 seconds (1.5 to 2 minutes of cooking), the Ramen was found to be a cooked Ramen having a high viscoelasticity.

By contrast, the uncooked Ramen for microwave cooking manufactured from the wheat flour prepared through milling of the wheat of Sample Groups 11 to 13 (the wheat exhibited under the differential scanning calorimetry an endothermic enthalpy (ΔH) of greater than 0.3 J/dry g at a thermal change onset temperature ($T_0$) of 80° C. or higher) did not attain an edible condition in 90 seconds of cooking (heating by an electronic oven). The Ramen finally attained an edible condition after 100 seconds or more of cooking, and the texture of the Ramen was found to be ordinary even after 120 seconds.

Example 4
Assessment of Wheat Regarding Suitability for Producing Noodles (Manufacture of Ramen for Microwave Cooking)

(1) As Sample Groups 17 to 20, four market classes of commersial hard wheat were provided. From each brand of wheat, wheat starch was prepared in the same manner in Example 1 (1).
Preparation of Wheat (2) Wheat starch obtained in procedure (1) was subjected to differential scanning calorimetry in the same manner as in Example 1 (2). In Table 10 below are shown the data of endothermic enthalpy (ΔH) as measured by the differential scanning calorimeter at a thermal change onset temperature ($T_0$) of not lower than 80° C.

Also, the crude protein content in each wheat starch obtained in procedure (1) was measured in the same manner as in Example 1. The results are shown in Table 10 below.

(3) The four market classes of commercial wheat prepared in procedure (1) were respectively subjected to the same conditioning as in Example 2 (3)(i). The wheat was added to the hopper of a milling machine (Buhler Laboratory Flour Mill manufactured by Buhler) placed in a room where temperature was regulated at 25° C., and milled at a feed rate of 66.7 g/min. In the milling machine, the roll clearances for different sets of rolls were adjusted as follows: brake roll left side; 0.1 mm, brake roll right side; 0.08 mm, middling roll left side; 0.06 mm, middling roll right side; 0.03 mm. The stock groups subjected to milling were six Stock Groups 1B to 3M shown in Table 1 below, bran group, and a bran short group.

TABLE 9

(Combination of Sieves)

| | Groups (stock groups) | | | | | |
|---|---|---|---|---|---|---|
| | 1B | 2B | 3B | 1M | 2M | 3M |
| Sieve[1] | 20W | 24W | 30W | 40W | 50W | — |
| Sieve[1] | 9XX | 10XX | 10XX | 10XX | 10XX | 11XX |
| Sieve[1] | | | | 10XX | 10XX | 11XX |

Note
[1] Sieve: The left part number represents sieve size, "W" represents a wire sieve, and "XX" represents a nylon sieve.

(4) The milled products obtained in procedure (3) were treated in the same way as in Example 1, to thereby obtain wheat flour of 60% extraction.

(5)(i) From the wheat flour of 60% extraction obtained in procedure (4), Ramen for microwave cooking was manufactured in the same way as in Example 3 (4). Then, each sample of the Ramen (100 g) was put in a plastic bag with its opening sealed, and allowed to stand overnight at room temperature (about 20° C.).

(ii) The following day, to each sample of uncooked wet Ramen prepared in procedure (i) placed in a heat-resistant container was poured hot water (about 95° C., 300 g), and the container was heated for 1 to 2 minutes in a microwave cooking instrument (Type ER-SC electronic oven (650 W) manufactured by Toshiba Corp.) with its opening open. Immediately after heating, concentrated soup was added to the Ramen in the container. Sensory evaluations of the cooked Ramen were performed by a trained panel of then members. Panelists compared the eating qualities of Ramen in accordance with the evaluation criteria shown in Table 7. The averaged evaluations are shown in Table 10 below.

TABLE 10

Properties of wheat starch

| Sample group | Crude protein content (%/dry) | Endothermic enthalpy (ΔH) (J/dry g) | Thermal change onset temp. ($T_0$) (° C.) | Eating quality of Ramen[2] Cooking Time (sec) | | | | |
|---|---|---|---|---|---|---|---|---|
| | | | | 60 | 75 | 90 | 105 | 120 |
| 17 | 0.31 | 0.61 | 92.8° C. | 1.2 | 1.6 | 2.3 | 2.9 | 3.4 |
| 18 | 0.32 | 0.64 | 93.0° C. | 1.4 | 1.8 | 2.5 | 3.0 | 3.6 |
| 19 | 0.28 | 0.66 | 92.9° C. | 1.5 | 1.9 | 2.5 | 3.0 | 3.7 |

TABLE 10-continued

Properties of wheat starch

| Sample group | Crude protain content (%/dry) | Endothermic enthalpy (ΔH) (J/dry g) | Thermal change onset temp. (T₀) (° C.) | Eating quality of Ramen[2] Cooking Time (sec) | | | | |
|---|---|---|---|---|---|---|---|---|
| | | | | 60 | 75 | 90 | 105 | 120 |
| 20 | 0.29 | 0.26 | 93.1° C. | 3.0 | 3.5 | 3.9 | 4.3 | 4.8 |

[1]Thermal change onset temperature (T₀) and endothermic enthalpy (ΔH) represent averages of five measurements.
[2]Unit of endothermic enthalpy (ΔH): J/dry g
[3]Under "Eating quality of Ramen" was shown the quality of each Ramen for microwave cooking which was measured immediately after cooking in an electronic oven.

(6) Assessment of Wheat Regarding Suitability for Producing Noodles

As seen from the results shown in Table 10, it is clear that there exists a strong relationship between the results of differential scanning calorimetry of the wheat starch contained in wheat and suitability of the wheat for producing noodles. Specifically, differential scanning calorimetry showed that the wheat starch contained in wheat that Sample Group 20 which exhibited an endothermic enthalpy (ΔH) of not greater than 0.3 J/dry g at a thermal change onset temperature (T₀) of 80° C. or higher, was very suitable for producing noodles, and the uncooked Ramen for microwave cooking manufactured from the wheat flour obtained through milling of the wheat of this group attained an edible condition in such a short time as 60 to 120 seconds (1 to 2 minutes) of cooking (heating by an electronic oven). Especially in such a short time as 90 to 120 seconds (1.5 to 2 minutes) of cooking, the Ramen was found to be a cooked Ramen having excellent smoothness and high viscoelasticity.

By contrast, the uncooked Ramen for microwave cooking manufactured from the wheat flour obtained through milling of the wheat of Sample Groups 17 to 19 (the wheat exhibited under the differential scanning calorimetry an endothermic enthalpy (ΔH) of greater than 0.3 J/dry g at a thermal change onset temperature (T₀) of 80° C. or higher) did not attain an edible condition in 90 seconds of cooking (heating by an electronic oven). The Ramen finally attained an edible condition after 100 seconds or more of cooking, and the texture of the Ramen was found to be ordinary even after 120 seconds.

Example 5
Assessment of Wheat Flour Regarding Suitability for Producing Noodles (Manufacture of Udon)

(1) As Sample Groups 21 to 24, four market brands of wheat flour were provided. The crude protein content (by dry weight %) of each brand of wheat flour was measured and found to be within the range of 9.8% to 9.9%. From each brand of wheat flour, wheat starch was prepared in the same manner as in Example 1 (1) except that the wheat flour of Sample Groups 21 to 24 was used instead of whole wheat flours obtained through milling of wheat.

(2) Wheat starch obtained in procedure (1) was subjected to differential scanning calorimetry in the same manner as in Example 1 (2). In Table 11 below are shown the data of endothermic enthalpy (ΔH) as measured by the differential scanning calorimeter at a thermal change onset temperature (T₀) of not lower than 80° C.

Also, the crude protein content in each wheat starch obtained in procedure (1) was measured in the same manner as in Example 1. The results are shown in Table 11 below.

(3) Uncooked Udon manufactured from each wheat flour of Sample Groups 21 to 24 in the same procedure as in Example 1 (4) was respectively cooked. Sensory evaluations of the cooked Udon were performed by a trained panel of ten members. Panelists compared the eating qualities of Udon in accordance with the evaluation criteria shown in Table 2. The averaged evaluations are shown in Table 11 below.

(4) Independent of procedure (3), uncooked Udon was manufactured from each wheat flour of Sample Groups 21 to 24 in the same way as in Example 1 (4), and the Udon (200 g) obtained was immediately boiled in boiling water (pH was adjusted to 5–6) while boiling time was adjusted so that the boiled noodle yield became 280±2%. Immediately after cooking, the Udon was washed with plenty of cold water, and then scooped up in a basket so as to drain water. The cooked and cooled Udon was weighed about 200 g, placed on a tray, and rapidly frozen to −30° C. The thus-obtained frozen noodles were sealed in a plastic bag for preventing dryness, and stored at −20° C. for one week. After one week had elapsed, the frozen noodles were taken out of the freezer, thawed in a large amount of boiling water for one minute. Immediately after thawing, the noodles were washed in water and drained of water. Sensory evaluations of the cooked Udon were performed by a trained panel of ten members. Panelists compared the eating qualities of Udon in accordance with the evaluation criteria shown in Table 2. The averaged evaluations are shown in Table 11 below. The boiled noodle yield was calculated in accordance with Equation (3) above.

TABLE 11

| Sample group | Crude protain content in wheat flour (%/dry) | Properties of Wheat starch | | | Eating quality of Udon | |
|---|---|---|---|---|---|---|
| | | Crude protain content (%/dry) | Endothermic enthalpy (ΔH) (%/dry g) | Thermal change onset temp.(T₀) (° C.) | Uncooked Udon After cooking | Frozen Udon after cooking |
| 21 | 9.9 | 0.30 | 0.46 | 93.5 | 3.3 | 2.8 |
| 22 | 9.5 | 0.28 | 0.51 | 93.2 | 3.4 | 2.8 |
| 23 | 9.9 | 0.28 | 0.19 | 93.8 | 4.5 | 4.3 |
| 24 | 9.8 | 0.32 | 0.20 | 94.0 | 4.7 | 4.4 |

Note
[1]Thermal change onset temperature (T₀) and endothermic enthalpy (ΔH) represent averages of five measurements.

Assessment of Wheat Flour Regarding Suitability for Producing Noodles

As seen from the results shown in Table 11, it is clear that there exists a strong relationship between the results of differential scanning calorimetry of the wheat starch contained in wheat flour and suitability of the wheat flour for producing noodles. Specifically, differential scanning calorimetry showed that the wheat starch contained in wheat flour that Sample Groups 23 and 24, which exhibited an endothermic enthalpy (ΔH) of not greater than 0.3 J/dry g at a thermal change onset temperature (T₀) of 80° C. or higher, was very suitable for producing noodles, and the Udon manufactured from the wheat flour of these groups exhibited high viscoelasticity, softness and thickness, smoothness, and very good texture, in both forms of noodle, i.e., boiled Udon which is obtained through boiling of uncooked noodles and frozen Udon which is obtained through freezing of boiled noodles.

Example 6
Assessment of Wheat Flour Regarding Suitability for Producing Noodles (Manufacture of Ramen)

(1) As Sample Groups 25 to 27, three market brands of wheat flour were provided. Crude protein contents (converted to dry weight) in these brands of wheat flour were measured by the above-described method and found to fall within a range of 12.7–13.0%. The wheat starch used in Example 6 was prepared in a similar manner as in procedure (1) of Example 1 except that wheat flours were used instead of whole wheat flours obtained through milling of wheat.

(2) Each Sample of the wheat starch obtained in procedure (1) was subjected to differential scanning calorimetry according to the same method as employed in procedure (2) of Example 1, to thereby obtain endothermic enthalpy ($\Delta H$) at a thermal change onset temperature ($T_0$) of not lower than 80° C. The results are shown in Table 12.

(3) Uncooked noodles (Ramen) were manufactured by use of each wheat flour of Sample Groups 25–27 in the same manner as in procedure (4) of Example 2, and then boiled. Sensory evaluations of the cooked Ramen were performed by a trained panel of ten members. Panelists compared the eating qualities of Ramen in accordance with the evaluation criteria shown in Table 5. The averaged evaluations are shown in Table 12 below.

(4) Independent of procedure (3), uncooked noodles (Ramen) were manufactured by use of each wheat flour of Sample Groups 25–27 in the same manner as in procedure (4) of Example 2. Each sample of thus-obtained uncooked Ramen (200 g) was boiled in boiling water while boiling time was adjusted so that the boiled noodle yield became 220±2%. Immediately after cooking, the Ramen was washed with plenty of cold water, and then scooped up in a basket so as to drain water. The cooked and cooled Ramen was weighed about 200 g, place on a tray, and rapidly frozen to −30° C. The thus-obtained frozen noodles were sealed in a plastic bag for preventing dryness, and stored at −20° C. for one week. After one week had elapsed, the frozen noodles were taken out of the freezer, thawed in a large amount of boiling water for one minute. Immediately after thawing, the noodles were placed into a bowl containing hot soup. Sensory evaluations of the cooked Ramen were performed by a trained panel of ten members. Panelists compared the eating qualities of Ramen in accordance with the evaluation criteria shown in Table 5. The averaged evaluations are shown in Table 12 below.

TABLE 12

| Sample group | Crude protein content in wheat flour (%/dry) | Properties of Wheat starch | | Eating quality of Udon | |
|---|---|---|---|---|---|
| | | Crude protein content (%/dry) | Endothermic enthalpy ($\Delta H$) (%/dry g) | Thermal change onset temp.($T_0$) (° C.) | Uncooked Udon After cooking | Frozen Udon after cooking |
| 25 | 13.0 | 0.35 | 0.60 | 92.8 | 3.6 | 3.3 |
| 26 | 13.0 | 0.33 | 0.61 | 93.0 | 3.4 | 3.0 |
| 27 | 12.8 | 0.32 | 0.28 | 93.2 | 4.6 | 4.3 |

Note
[1)]Thermal change onset temperature ($T_0$) and endothermic enthalpy ($\Delta H$) represent averages of five measurements.

(5) Assessment of Wheat Flour Regarding Suitability for Producing Noodles

As seen from the results shown in Table 12, it is clear that there exists a strong relationship between the results of differential scanning calorimetry of the wheat starch contained in wheat flour and suitability of the wheat flour for producing noodles. Specifically, differential scanning calorimetry showed that the wheat starch contained in wheat flour that Sample Group 27, which exhibited an endothermic enthalpy ($\Delta H$) of not greater than 0.3 J/dry g at a thermal change onset temperature ($T_0$) of 80° C. or higher, was very suitable for producing noodles, and the Ramen manufactured from the wheat flour of Sample Group 27 exhibited high viscoelasticity, elasticity, smoothness, springiness and very good texture, in both forms of noodle, i.e., boiled Ramen which is obtained through boiling of uncooked noodles and frozen Ramen which is obtained through freezing of boiled noodles.

Example 7

Assessment of Wheat Flour Regarding Suitability for Producing Noodles (Manufacture of Uncooked Wet Ramen for Microwave Cooking)

(1) As Sample Groups 28 to 34, seven market brands of wheat flour were provided. Crude protein contents (converted to dry weight) in these brands of wheat flour were measured according to the above-described method and the results are shown in Table 13 below. Wheat starch used in Example 7 was prepared in a similar manner as in procedure (1) of Example 1 except that wheat flours were used instead of whole wheat flours obtained through milling of wheat.

(2) Each Sample of the wheat starch obtained in procedure (1) was subjected to differential scanning calorimetry according to the same method as employed in procedure (2) of Example 1, to thereby obtain endothermic enthalpy ($\Delta H$) at a thermal change onset temperature ($T_0$) of not lower than 80° C. The results are shown in Table 13.

(3)(i) Uncooked wet noodles (Ramen) for microwave cooking were manufactured by use of each wheat flour of Sample Groups 28–34 in the same manner as in Example 3. Each sample of the Ramen weighing 100 g was sealed in a plastic bag and allowed to stand at room temperature (about 20° C.) overnight.

(ii) On the following day, each sample of the uncooked wet Ramen obtained in procedure (i) above was placed in a heat-resisting container, to which 300 g of hot water (about 95° C.) was added, and then subjected to cooking with an open-type microwave cooking appliance (ER-CS type microwave oven:650 W, product of Toshiba Corp.) for 1–2 minutes. Immediately after cooking, concentrated soup was added to the container. Sensory evaluations of the cooked Ramen were performed by a trained panel of ten members. Panelists compared the eating qualities of Ramen in accordance with the evaluation criteria shown in Table 7. The averaged evaluations are shown in Table 13 below.

TABLE 13

| Sample group | Wheat flour | | | Properties of wheat starch | | Eating quality of Ramen (evaluated immediately after cooking) Cooking time (sec) | | | | |
|---|---|---|---|---|---|---|---|---|---|---|
| | Ash content (%/dry) | Crude protein content (%/dry) | Crude protain content (%/dry) | Endothermic enthalpy (ΔH) (%/dry g) | Thermal change onset temp.($T_0$) (° C.) | 60 | 75 | 90 | 105 | 120 |
| 28 | 0.54 | 9.9 | 0.30 | 0.46 | 93.5 | 1.9 | 2.3 | 2.7 | 3.2 | 3.7 |
| 29 | 0.41 | 9.8 | 0.28 | 0.51 | 93.2 | 2.0 | 2.5 | 2.9 | 3.3 | 3.8 |
| 30 | 0.40 | 13.0 | 0.35 | 0.60 | 92.8 | 1.2 | 1.5 | 2.0 | 2.5 | 3.0 |
| 31 | 0.41 | 13.0 | 0.33 | 0.61 | 93.0 | 1.3 | 1.6 | 2.2 | 2.6 | 3.1 |
| 32 | 0.41 | 12.8 | 0.32 | 0.28 | 93.2 | 3.0 | 3.5 | 3.9 | 4.3 | 4.7 |
| 33 | 0.41 | 9.9 | 0.28 | 0.19 | 93.8 | 3.2 | 3.8 | 4.3 | 4.7 | 5.0 |
| 34 | 0.40 | 9.8 | 0.32 | 0.20 | 94.0 | 3.1 | 3.6 | 4.0 | 4.4 | 4.9 |

Note 1) Thermal change onset temperature ($T_0$) and endothermic enthalpy (ΔH) represent averages of five measurements.

(4) Assessment of Wheat Flour Regarding Suitability for Producing Noodles:

As seen from the results shown in Table 13, it is clear that there exists a strong relations hip between the results of differential scanning calorimetry of the wheat starch contained in wheat flour and suitability of the wheat flour for producing noodles. Specifically, differential scanning calorimetry showed that the wheat starch contained in wheat flour that Sample Groups 32–34, which exhibited an endothermic enthalpy (ΔH) of not greater than 0.3 J/dry g at a thermal change onset temperature ($T_0$) of 80° C. or higher, were very suitable for producing noodles. The uncooked wet Ramen for microwave cooking manufactured from the wheat flours of Samples Groups 32–34 became edible after being cooked only for 60–120 seconds (1–2 min.) with a microwave oven, and exhibited high viscoelasticity and smoothness after being cooked only for 90–120 seconds (1.5–2 min.). In contrast, differential scanning calorimetry showed that the wheat starch contained in wheat flour that Sample Groups 28–31, which exhibited an endothermic enthalpy (ΔH) of greater than 0.3 J/dry g at a thermal change onset temperature ($T_0$) of 80° C. or higher, provided uncooked wet Ramen for microwave cooking which didn't become edible after being cooked for 90 seconds (heating time by a microwave oven), and which became edible only after being cooked for over 100 seconds, and which didn't exhibit particularly good texture even after being heated for 120 seconds.

Example 8
Assessment of Wheat Flour Regarding Suitability for Producing Noodles (Manufacture of Pasta Wrapping for Gyoza (Chinese Meat Dumpling))

(1) As Sample Groups 35 to 37, three market brands of wheat flour were provided. Crude protein contents (converted to dry weight) in these brands of wheat flour were measured by the above-described method and the results are shown in Table 15 below. The wheat starch was prepared in the same manner as in Example 1 (1) except that the wheat flour of Sample Groups 35 to 37 was used instead of whole wheat flours obtained through milling of wheat.

(2) Wheat starch obtained in procedure (1) was subjected to differential scanning calorimetry in the same manner as in Example 1 (2). In Table 15 below are shown the data of endothermic enthalpy (ΔH) as measured by the differential scanning calorimeter at a thermal change onset temperature ($T_0$) of not lower than 80° C.

Also, the crude protein content in each wheat starch obtained in procedure (1) was measured in the same manner as in Example 1. The results are shown in Table 15 below.

(3) In accordance with the following method, Gyoza was manufactured through use of pasta wrapping for Gyoza manufactured from each of Sample Groups 35 to 37.
Manufacture of pasta wrapping for Gyoza and Gyoza (i) The ingredients (1 Kg flour and 360 g water) were mixed in a horizontal type mixer for 12 minutes at 90 r.p.m. After mixing, crumbly dough mixture was transferred to noodle sheeting machine, sheeted between steel rollers 3.0 mm apart, folded once, sheeted, folded twice, sheeted, and then allowed to rest in a polyethylene bag for 30 minutes at room temperature. The single sheet of dough was then passed between the rollers four times, with the clearance successively reduced. The final thickness of the sheeted dough was adjusted to 0.8 mm. Then, round pieces were cut out from the sheets by means of a circular cutting pattern having a diameter of 8.7 mm, to thereby obtain pasta wrapping for Chinese meat dumpling.

(ii) Each of the pasta wrapping for Chinese meat dumpling obtained in procedure (1) was stuffed with a mixture (12 g) of minced meat, chopped vegetables and seasonings, and formed properly, to thereby manufacture a uncooked Chinese meat dumpling.

(iii) The uncooked Chinese meat dumpling obtained in procedure (ii) were placed on a heated frying pan on which salad oil was spread. When the Chinese meat dumpling were burn light brown, a small amount of water was added, and the Chinese meat dumpling were additionally cooked. When water was all extinguished on the frying pan and the stuffed mixture was sufficiently heated, heating was stopped and the Chinese meat dumpling were placed on a plate. Sensory evaluations of cooked pasta wrapping for Gyoza were performed by a trained panel of ten members. Panelists compared the eating qualities of pasta wrapping for Gyoza in accordance with the evaluation criteria shown in Table 14. The averaged evaluations are shown in Table 15 below.

(iv) Independently of procedure (iii), uncooked Gyozas obtained in the same manner as in procedure (i) and (ii) were placed in a steaming cage, sprayed with water, and steamed for 8 minutes. After steaming, the Chinese meat dumpling were rapidly frozen to −30° C. to make frozen Chinese meat dumpling, which were put in a plastic bag and stored in a freezer at −20° C. for one week.

After one week had elapsed, frozen Chinese meat dumpling were taken out of the freezer, and heated in the same manner as in procedure (iii). Sensory evaluations of cooked pasta wrapping for Gyoza were performed by a trained panel of ten members. Panelists compared the eating qualities of pasta wrapping for Gyoza in accordance with the evaluation criteria shown in Table 14. The averaged evaluations are shown in Table 15 below.

TABLE 14

(Evaluation criteria for pasta wrapping for Gyoza)

| | |
|---|---|
| 5 points | Very flexible but solid, and very good mouth feeling |
| 4 points | Flexible but solid, and good mouth feeling |
| 3 points | No particular features in flexibility and melting property in the mouth, and ordinary texture |
| 2 points | Slightly crumbly and fragile, or slightly gummy texture |
| 1 points | Crumbly and fragile, or gummy texture for biting off |

TABLE 15

| Sample groups | Crude protain content in wheat flour (%/dry) | Properties of wheat starch | | | Eating quality Of past wrapping for Gyoza | |
|---|---|---|---|---|---|---|
| | | Crude protein content (%/dry) | Endo-thermic enthalpy (ΔH) (%/dry g) | Thermal change onset temp.($T_0$) (° C.) | Uncooked Gyoza After cooking | Frozen Gyoza after cooking |
| 35 | 13.0 | 0.35 | 0.60 | 92.8 | 3.6 | 3.5 |
| 36 | 13.0 | 0.33 | 0.61 | 93.0 | 3.4 | 3.4 |
| 37 | 12.8 | 0.32 | 0.28 | 93.2 | 4.5 | 4.3 |

Note 1) Thermal change onset temperature ($T_0$) and endothermic enthalpy (ΔH) represent averages of five measurements.

(2) Assessment of Wheat Flour Regarding Suitability for Producing Noodles

As seen from the results shown in Table 15, it is clear that there exists a strong relationship between the results of differential scanning calorimetry of the wheat starch contained in wheat flour and suitability of the wheat flour for producing noodles. Specifically, differential scanning calorimetry showed that the wheat starch contained in wheat flour that Sample Group 37, which exhibited an endothermic enthalpy (ΔH) of not greater than 0.3 J/dry g at a thermal change onset temperature ($T_0$) of 80° C. or higher, was very suitable for producing noodles, and the pasta wrapping for Gyoza manufactured from this group exhibited high elasticity, solid, and very good mouth feel, in both forms of Gyoza; i.e., uncooked Gyoza and frozen Gyoza which is obtained through freezing of steamed Gyoza. Example 9: Assessment of Wheat Flour Regarding Suitability for Producing Noodles (Manufacture of Uncooked Wet Ramen for Microwave Cooking)

(1) Uncooked Ramen for microwave cooking was manufactured in the same manner as in Example 3 through use of a farina composition in which the starch shown in Table 17 below was added to the same commercially available wheat as that used in each of Sample Groups 29, 30, 33 and 34 of Example 7 in the proportion shown in Table 17. Each sample of the thus-manufactured Ramen (100 g) was put in a plastic bag with its opening sealed, and allowed to stand overnight at room temperature (about 20° C.).

(ii) The following day, to each sample of uncooked Ramen obtained in procedure (i) placed in a heat-resistant container was poured hot water (about 95° C., 300 g), and the container was heated for 1 to 2 minutes in a microwave cooking instrument (Type ER-SC electronic oven (650 W) manufactured by Toshiba Corp.). Immediately after heating, concentrated soup was added to the Ramen in the container. Sensory evaluation of cooked Ramen were performed by a trained panel of ten members. Panelists compared the eating qualities of Ramen in accordance with the evaluation criteria shown in Table 16. The averaged evaluations are shown in Table 17 below.

(iii) Also, at five minutes after cooking. Sensory evaluation of cooked Ramen were performed again by a trained panel of ten members. Panelist compared the eating qualities of Ramen, soaked in hot soup for 5 minutes after cooking, in accordance with the evaluation criteria shown in Table 16. The averaged evaluations are shown in Table 17 below.

TABLE 16

(Evaluation criteria for noodles five min after cooking)

| | |
|---|---|
| 5 points | No textural deterioration due to soaking in hot soup for 5 minutes after cooking, adequately hard, remaining viscoelasity, smooth, and very good texture |
| 4 points | Substantially no textural deterioration due to soaking in hot soup for 5 minutes after cooking, remaining resilience, and good texture |
| 3 points | Slight textural deterioration due to soaking in hot soup for 5 minutes after cooking, slightly softened with slight resilience, and ordinary texture |
| 2 points | Considerable textural deterioration due to soaking in hot soup for 5 minutes after cooking, soft with no resilience, and poor texture |
| 1 points | Great textural deterioration due to soaking in hot soup for 5 minutes after cooking, very soft, and very poor texture |

TABLE 17

| Sample group | Wheat flour Type[1]) and Amount (wt. %) | Starch Type and Amount (wt. %) | Eating quality of Ramen | | | | | |
|---|---|---|---|---|---|---|---|---|
| | | | Evaluation immediately after cooking Cooking time (sec) | | | | | Five minutes after cooking |
| | | | 60 | 75 | 90 | 105 | 120 | |
| 38 | A 97 | Potato starch 3 | 3.3 | 3.8 | 4.3 | 4.7 | 5.0 | 3.5 |
| 39 | A 95 | Potato starch 5 | 3.5 | 4.0 | 4.6 | 5.0 | —[2]) | 3.7 |
| 40 | A 93 | Potato starch 7 | 3.7 | 4.3 | 4.8 | 5.0 | —[2]) | 4.1 |
| 41 | A 85 | Potato starch 15 | 4.0 | 4.6 | 5.0 | —[2]) | —[2]) | 4.6 |
| 42 | A 80 | Potato starch 20 | 4.1 | 4.7 | 5.0 | —[2]) | —[2]) | 4.5 |
| 43 | A 75 | Potato starch 25 | 4.3 | 4.8 | 5.0 | —[2]) | —[2]) | 4.0 |
| 44 | A 70 | Potato starch 30 | 4.5 | 4.9 | 5.0 | —[2]) | —[2]) | 3.3 |
| 45 | A 60 | Potato starch 40 | 4.7 | 5.0 | —[2]) | —[2]) | —[2]) | 3.1 |
| 46 | A 85 | Tapioca starch 15 | 4.1 | 4.7 | 5.0 | —[2]) | —[2]) | 4.5 |
| 47 | A 85 | Glutinous corn starch 15 | 4.1 | 4.5 | 5.0 | —[2]) | —[2]) | 4.1 |
| 48 | A 85 | Non-glutinous corn starch 15 | 3.8 | 4.3 | 4.7 | 5.0 | —[2]) | 4.0 |
| 49 | A 93 | Potato starch 3.5 Tapioca starch 3.5 | 3.8 | 4.3 | 4.9 | 5.0 | —[2]) | 4.1 |
| 50 | B 93 | potato starch 7 | 3.3 | 3.8 | 4.3 | 4.7 | 5.0 | 4.7 |
| 51 | A 93 | Etherified potato starch 7 | 3.9 | 4.5 | 4.9 | 5.0 | —[2]) | 4.0 |
| 52 | A 50 | potato starch 50 | 4.9 | 5.0 | —[2]) | —[2]) | —[2]) | 2.1 |

TABLE 17-continued

| Sample group | Wheat flour Type[1] and Amount (wt. %) | Starch Type and Amount (wt. %) | Eating quality of Ramen Evaluation immediately after cooking Cooking time (sec) | | | | | Five minutes after cooking |
|---|---|---|---|---|---|---|---|---|
| | | | 60 | 75 | 90 | 105 | 120 | |
| 53 | A 99 | Potato starch 1 | 3.3 | 3.8 | 4.4 | 4.8 | 5.0 | 2.8 |
| 54 | A 100 | — 0 | 3.2 | 3.8 | 4.3 | 4.7 | 5.0 | 2.7 |
| 55 | C 93 | Potato starch 7 | 2.6 | 3.1 | 3.7 | 4.4 | 4.8 | —[3] |
| 56 | D 93 | Potato starch 7 | 1.6 | 2.1 | 2.8 | 3.6 | 4.3 | —[3] |

[1] Type of wheat flour
A: Wheat flour used in Sample Group 33 of Example 7 (ash content in wheat flour = 0.41%, crude protein content in wheat flour = 9.9%; crude protein content in starch of wheat flour = 0.28%, ΔH = 0.19)
B: Wheat flour used in Sample Group 34 of Example 7 (ash content in wheat flour = 0.40%, crude protein content in wheat flour = 9.8%; crude protein content in starch of wheat flour = 0.32%, ΔH = 0.20)
C: Wheat flour used in Sample Group 29 of Example 7 (ash content in wheat flour = 0.41%, crude protein content in wheat flour = 9.8%; crude protein content in starch of wheat flour = 0.28%, ΔH = 0.51)
D: Wheat flour used in Sample Group 30 of Example 7 (ash content in wheat flour = 0.40%, crude protein content in wheat flour = 13.0%; crude protein content in starch of wheat flour = 0.35%, ΔH = 0.61)
[2] Since the evaluation achieved 5 points, no evaluation was performed thereafter.
[3] Since the evaluation did not achieve 5 points, even after cooking for 120 sec or more, no evaluation was performed at 5 minutes after cooking.

TABLE 17 (2/2)

| Sample Group | Wheat flour Type[1] and Amount (wt. %) | Starch Type And Amount (wt. %) | Eating quality of Ramen Evaluation Immediately after cooking Cooking time (sec) | | | | | minutes after cooking |
|---|---|---|---|---|---|---|---|---|
| | | | 60 | 75 | 90 | 105 | 120 | |
| 50 | B 93 | potato starch 7 | 3.3 | 3.8 | 4.3 | 4.7 | 5.0 | 4.7 |
| 51 | A 93 | Etherified potato starch 7 | 3.9 | 4.5 | 4.9 | 5.0 | —[2] | 4.0 |
| 52 | A 50 | potato starch 50 | 4.9 | 5.0 | —[2] | —[2] | —[2] | 2.1 |
| 53 | A 99 | Potato starch 1 | 3.3 | 3.8 | 4.4 | 4.8 | 5.0 | 2.8 |
| 54 | A 100 | — 0 | 3.2 | 3.8 | 4.3 | 4.7 | 5.0 | 2.7 |
| 55 | C 93 | Potato starch 7 | 2.6 | 3.1 | 3.7 | 4.4 | 4.8 | —[3] |
| 56 | D 93 | Potato starch 7 | 1.6 | 2.1 | 2.8 | 3.6 | 4.3 | —[3] |

[1] Type of wheat flour
A: Wheat flour used in Sample Group 33 of Example 7 (ash content in wheat flour = 0.41%, crude protein content in wheat flour = 9.9%; crude protein content in starch of wheat flour = 0.28%, ΔH = 0.19)
B: Wheat flour used in Sample Group 34 of Example 7 (ash content in wheat flour = 0.40%, crude protein content in wheat flour = 9.8%; crude protein content in starch of wheat flour = 0.32%, ΔH = 0.20)
C: Wheat flour used in Sample Group 29 of Example 7 (ash content in wheat flour = 0.41%, crude protein content in wheat flour = 9.8%; crude protein content in starch of wheat flour = 0.28%, ΔH = 0.51)
D: Wheat flour used in Sample Group 30 of Example 7 (ash content in wheat flour = 0.40%, crude protein content in wheat flour = 13.0%; crude protein content in starch of wheat flour = 0.35%, ΔH = 0.61)
[2] Since the evaluation achieved 5 points, no evaluation was performed thereafter.
[3] Since the evaluation did not achieve 5 points, even after cooking for 120 sec or more, no evaluation was performed at 5 minutes after cooking.

(2) Assessment of Wheat Regarding Suitability for Producing Noodles

As seen from the results shown in Table 17, the uncooked wet Ramen for microwave cooking manufactured from the commercial wheat flour of Sample Groups 38 to 53 which exhibited an endothermic enthalpy ($\Delta H$) of not greater than 0.3 J/dry g at a thermal change onset temperature ($T_0$) of 80° C. or higher resulted in cooked Ramen having excellent smoothness, high viscoelasticity, and good texture in such a very short time of 90 seconds or less of cooking.

By contrast, the uncooked wet Ramen for microwave cooking manufactured from the commercial wheat flour of Sample Groups 55 and 56 (the wheat exhibited under the differential scanning calorimetry an endothermic enthalpy ($\Delta H$) of greater than 0.3 J/dry g at a thermal change onset temperature ($T_0$) of 80° C. or higher) requires relatively long time for being cooked until it became edible.

As described above, the present invention realizes simple, quick, and accurate assessment of wheat or wheat flour as to whether or not it has suitability for preparing noodles by just collecting starch from wheat or wheat flour and carrying out differential scanning calorimetry.

In differential scanning calorimetry, wheat starch is examined as to whether it exhibits an endothermic enthalpy ($\Delta H$) of 0.3 J/g of dry matter or less at a thermal change onset temperature ($T_0$) of 80° C. or higher.

By use of wheat flour obtained from wheat containing starch having an endothermic enthalpy ($\Delta H$) of 0.3 J/g of dry matter or less at a thermal change onset temperature ($T_0$) of 80° C. or higher when the starch is analyzed by differential scanning calorimetry, or by use of already milled wheat flour containing starch of the same characteristics, a variety of noodles with high quality—excellent texture in terms of viscoelasticity, softness, thickness, springiness, smoothness, etc.—can be prepared.

Particularly, uncooked noodles for microwave cooking according to the present invention obtained by use of wheat flour which has already been milled or wheat flour obtained from wheat, the wheat flour or the wheat containing starch having an endothermic enthalpy ($\Delta H$) of 0.3 J/g of dry matter or less at a thermal change onset temperature ($T_0$) of 80° C. or higher when the starch is analyzed by differential scanning calorimetry, can be cooked with heat into eatable noodles within shorter time as compared with conventional cases, and provide excellent eating qualities, when the noodles are cooked in a microwave oven or with similar cooking utensils after being put in a container with cold water or hot water added thereto.

Moreover, the uncooked noodles for microwave cooking according to the present invention which are prepared from combined use of the aforementioned wheat flour and starch require even shorter time for microwave cooking, cause less deterioration in elastic characteristics of noodles, thus maintaining high quality for prolonged periods.

What is claimed is:

1. A method of manufacturing wheat flour for producing noodles by use of wheat containing starch having an endothermic enthalpy ($\Delta H$) of 0.3 J/g of dry matter or less at a thermal change onset temperature ($T_0$) of 80° C. or higher when the starch is analyzed by differential scanning calorimetry in the presence of added water.

2. A wheat flour for preparing noodles, which wheat flour is obtained by milling wheat containing starch having an endothermic enthalpy ($\Delta H$) of 0.3 J/g of dry matter or less at a thermal change onset temperature (To) of 80° C. or higher when the starch is analyzed by differential scanning calorimetry in the presence of added water.

3. A wheat flour for preparing noodles, the wheat flour containing starch having an endothermic enthalpy (ΔH) of 0.3 J/g of dry matter or less at a thermal change onset temperature (To) of 80° C. or higher when the starch is analyzed by differential scanning calorimetry in the presence of added water.

4. A farina composition for noodles characterized by containing the wheat flour for preparing noodles as described in claim 2 or 3 and starch.

5. The farina composition for noodles according to claim 4, wherein the starch is at least one species selected from among potato starch, tapioca starch, corn starch, and chemically-processed starches prepared therefrom.

6. The farina composition for noodles according to claim 4, wherein the starch is contained in an amount of 3–40% by weight with respect to the total weight of the farina of the composition.

7. A noodle prepared with the farina composition as described in claim 4.

8. The farina composition for noodles according to claim 4, which is for manufacture of uncooked moisture-containing noodles, uncooked moisture-containing noodles for microwave cooking, semi-dry noodles, dry noodles, boiled noodles, steamed noodles, frozen noodles, or instant noodles.

9. The farina composition for noodles according to claim 4, which is for manufacture of Udon, Kishimen, Somen, Hiyamugi, Chinese-type noodles, pastas, and soba.

10. The farina composition for noodles according to claim 4, which is for manufacture of uncooked, Chinese-type yellow alkaline noodles for microwave cooking.

11. The wheat flour for noodles according to claim 2 or 3, which is for manufacture of uncooked moisture-containing noodles, uncooked moisture-containing noodles for microwave cooking, semi-dry noodles, dry noodles, boiled noodles, steamed noodles, frozen noodles, or instant noodles.

12. The wheat flour for noodles according to claim 2 or 3, which is for manufacture of Udon, Kishimen, Somen, Hiyamugi, Chinese-type noodles, pastas, and soba.

13. The wheat flour for noodles according to claim 2 or 3, which is for manufacture of uncooked, Chinese-type yellow alkaline noodles for microwave cooking.

14. The noodle according to claim 13, which is suitable for microwave cooking.

15. A method of preparing noodles which comprises mixing the wheat flour described in claim 4 or 5, starch and water to provide a noodle dough composition for preparing noodles.

16. A noodle prepared from the wheat flour for preparing noodles as described in claim 2 or 3.

17. A method of making noodles selected from the group consisting of Udon, Kishimen, Somen, Hiyamugi, Chinese-style noodles, pastas and soba by providing a wheat flour which is obtained by milling wheat containing starch having an endothermic enthalpy of 0.3 J/g of dry matter or less at a thermal change onset temperature of 80° C. or higher when the starch is analyzed by differential scanning calorimetry in the presence of water.

18. A noodle prepared from the farina composition of claim 4 for manufacture of Udon, Kishimen, Somen, Hiyamugi, Chinese-type noodles, pasta or Soba.

\* \* \* \* \*